Jan. 16, 1940.    L. G. MURPHY    2,187,049
COMBINATION DISPENSING CONTAINER VALVE
Filed Nov. 13, 1937
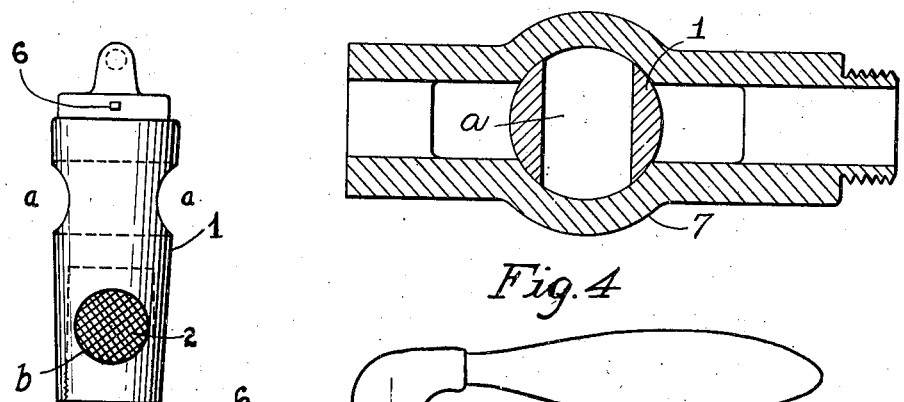
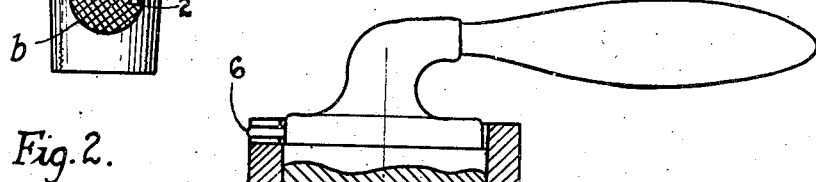
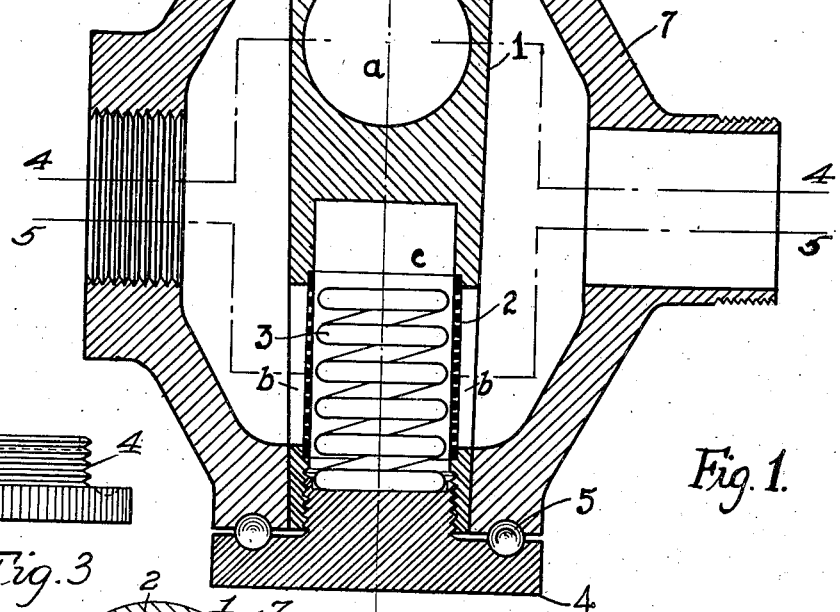
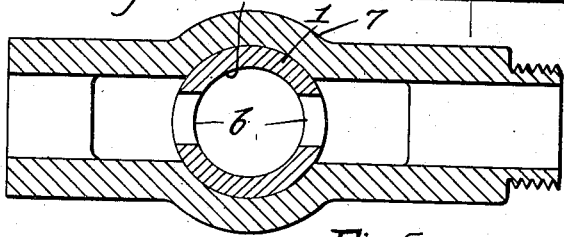
INVENTOR.
Louis G. Murphy.

Patented Jan. 16, 1940

2,187,049

UNITED STATES PATENT OFFICE 2,187,049

COMBINATION DISPENSING CONTAINER VALVE

Louis G. Murphy, Newark, N. J.

Application November 13, 1937, Serial No. 174,347

7 Claims. (Cl. 299—84)

It is the principal object of my invention to provide a new type of dispensing valve in which the valve plug or valve member is provided with a chamber within which any desired and suitable material in compact form may be placed, so that when the valve member is in one position, the fluid passing through the valve may pick up or absorb a certain amount of the material in the valve chamber. This material may be in the form of fused compound of bath salts or medicated or antiseptic matter, when the valve is used for bathroom purposes.

Another object of my invention is to provide a dispensing valve in which the valve member is constructed so that the fluid may be passed through the valve without passing through the chamber in the valve member, and at the same time the valve may be adjusted so that the amount of fluid going through the valve may be sent through the valve chamber in whole or in part.

While I have mentioned one useful purpose for my valve, it has other useful applications; for example, it may be used to dispense an insecticide through a hose line.

My invention will be readily understood by reference to the annexed drawing, wherein:

Figure 1 is a vertical section through the device, the valve member being in a position to pass the fluid through the chamber in the valve member.

Figure 2 is an elevational view of the valve member withdrawn from the casing, the valve being turned 90° from its position shown in Figure 1.

Figure 3 is a view of the screw-cap which may be used to close the chamber in the valve member shown in Figure 1.

Figure 4 is a section on the line 4—4 of Figure 1.

Figure 5 is a section on the line 5—5 of Figure 1, without the spring port screens and dispensing material being shown.

In the various views, 7 is a valve casing having inlet and outlet orifices by which fluid, such as water, may be passed through the valve. The casing 7 carries a valve member 1 which is preferably tapered and has the outer periphery ground to provide a suitable fit in the casing. The upper part of the valve member 1 has a cross-bore or hole $a$ which cooperates with spaces within the casing, when the valve is in the position of Figure 2, to allow the free passage of fluid through the valve. The lower part of the valve member 1 is provided with a chamber $c$ having oppositely disposed ports $b$ which are arranged at right angles to the axis of the port or hole $a$ in the upper part of the valve member. This hollow chamber $c$ is designed to receive any suitable mass or fused compound which is desired to be dispensed from the valve. This compact material should be such that it will slowly disintegrate on passage of water through the chamber. The ports $b$ are provided with fine-meshed screens 2 to give a filtering action to the passage of the fluid through the valve and assist in retaining the disintegrated compact material within the valve chamber until the larger particles thereof are dissolved.

The valve member is held in position in the casing by a cap 4 which is attached to the lower end of the valve member in any suitable manner as by male threads on the cap engaging female threads on the valve member. Positioned within the chamber of the valve member is a light-pressure spring 3 which is held in position by the cap 4. This spring serves to hold the compact material in position within the chamber and, as indicated in the drawing, in the upper part of the chamber, a considerable portion of which is out of the direct path of the water through the ports $b$, thereby reducing the rate of disintegration of the compact. The cap 4 has a flange for engaging part of the casing, and positioned between the flange of the cap 4 and the casing are anti-friction members, thereby providing a mechanical connection between the valve member and the casing, which can be set to give an easy-operating valve which is quite essential when the device is used in the bathroom for dispensing bath salts, or medicated or antiseptic matter.

The valve member 1 is provided with a stop 6 which positively locates the position of the valve member so as to act as a dispensing valve or as a direct delivery valve for the fluid.

Having thus described my invention, what I claim is:

1. In a device of the class described, a casing having fluid inlet and outlet openings and interior inlet and outlet spaces, an adjustable valve member carried by the casing forming said interior spaces between itself and the casing and for controlling the flow of fluid through said spaces, said valve member having a chamber for holding a compact material to be gradually taken up by fluid passing through the chamber, the wall of the chamber having ports therein to allow fluid to pass from an inlet space through the valve chamber into an outlet space when the valve is in one position of adjustment, said valve member having a transverse hole therethrough spaced from said chamber and adapted to establish a direct path for the fluid through the casing in another position of adjustment of said valve member.

2. A device as set forth in claim 1, further characterized in that the valve member is carried by the casing transversely of the inlet and outlet openings therein, a spring within the valve chamber for holding the compact material in one end of the chamber and means engaging an end of the valve member for holding the spring in said chamber and also for holding the valve member in operative position in the casing.

3. In a device of the class described, a casing having fluid inlet and outlet openings and interior inlet and outlet spaces, an adjustable valve member carried by the casing forming said interior spaces between itself and the casing and for controlling the flow of fluid through said spaces, said valve member having a chamber at one end for holding a compact material to be taken up by fluid passing through the chamber, the wall of which has oppositely positioned ports to allow fluid to pass from one casing space to another through the chamber when the valve is in one position of adjustment, said valve member having a transverse hole therethrough at the end opposite said chamber and at right angles to the axis of chamber ports, and adapted to by-pass fluid from said valve chamber on adjustment of said valve member.

4. A device as set forth in claim 3, further characterized in that both chamber ports are provided with screens.

5. A device for the purposes described, comprising a casing having fluid inlet and outlet openings, a valve member passing through the casing and forming spaces between itself and the casing, adjustable takeup, means for holding the valve member in position, means for rotating the valve member, said valve member having a compact material-dispensing chamber in one end and also having arcuately spaced ports connecting the chamber with spaces within the casing, said valve member further having a hole therethrough adjacent the chamber, but having its axis at an angle to the axis of said ports whereby fluid may be by-passed as desired from said ports.

6. A device as set forth in claim 5, further characterized in that said valve chamber carries a spring which coacts with said holding means to resiliently hold the compact material in one end of the casing, and further characterized in that the ports are provided with screens.

7. A device as set forth in claim 5, further characterized in that said holding means comprise a cap fitting on the chamber end of said valve member and having a flange overlapping a part of said casing, anti-friction members positioned between the cap flange and the casing, and a spring located in said valve chamber and held therein by said cap for the purpose described.

LOUIS G. MURPHY.